Patented Jan. 2, 1923.

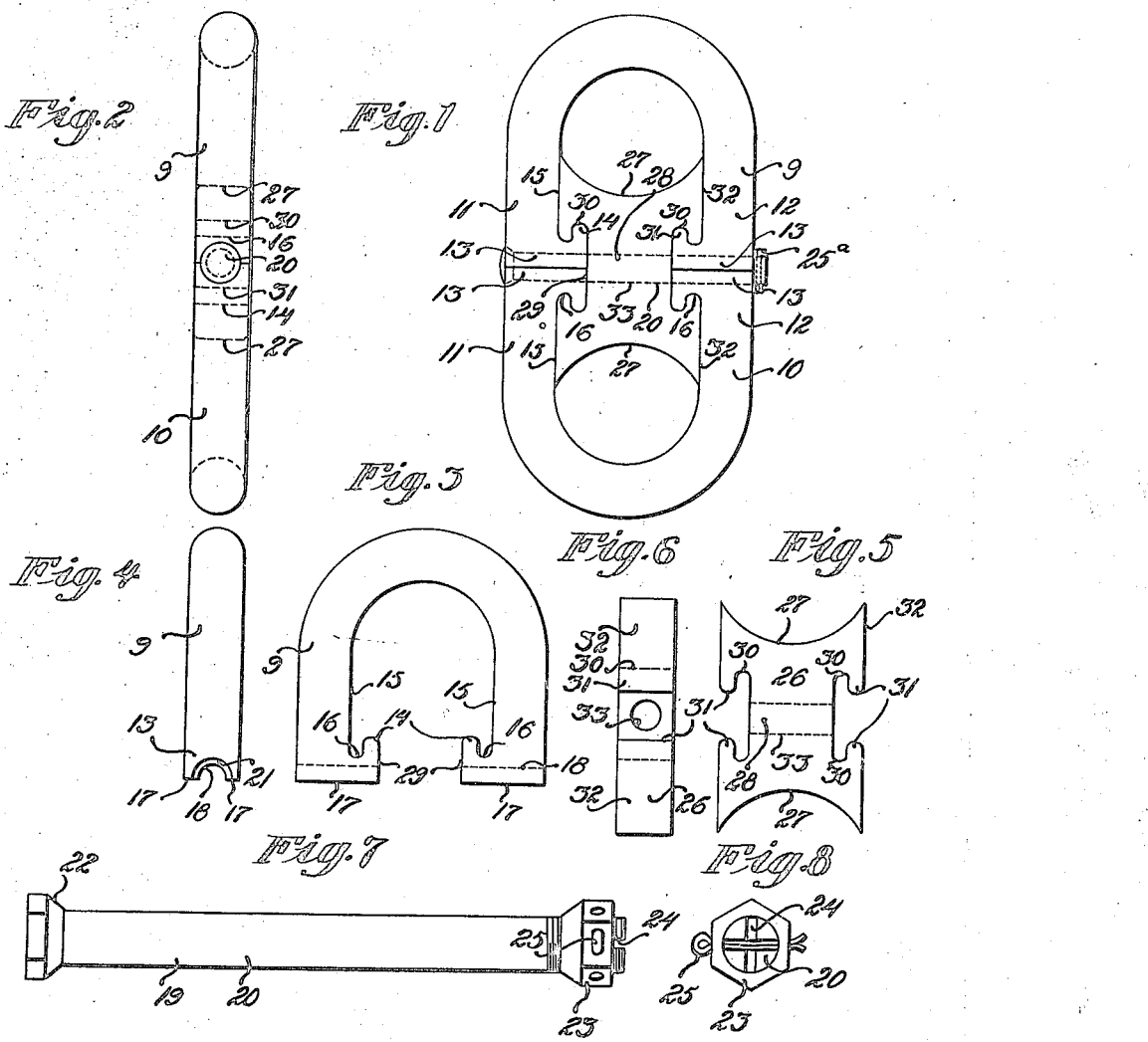

1,440,436

UNITED STATES PATENT OFFICE.

WILLIAM MATHIS BATEMAN, OF NEWARK, DELAWARE.

CHAIN LINK.

Application filed July 3, 1920. Serial No. 393,922.

*To all whom it may concern:*

Be it known that I, WILLIAM M. BATEMAN, a citizen of the United States, residing at Newark, in the county of New Castle and State of Delaware, have invented certain new and useful Improvements in Chain Links, of which the following is a specification.

It is well known that it is often necessary to piece, repair or extend the length of chains such for example as chains in which the links are each welded so as to form a completely closed link chain. This renders the repairing or extension of chains difficult and it is one object of my present invention to provide a split link which may be used for the above purpose to facilitate the operation.

Another object is to make my improved link of a strong and comparatively simple construction.

These objects, and other advantageous ends which will be described hereinafter, I attain in the following manner, reference being had to the accompanying drawings in which Figure 1 is a face view of a split link made in accordance with my invention, Figure 2 is a side view of Figure 1, Figure 3 is a face view of one of two similarly formed link sections, Figure 4 is a side view of Figure 3, Figure 5 is a face view of a connecting stud plate which forms a part of my improved link, Figure 6 is a side elevation of Figure 5, Figure 7 is a transverse elevation of a bolt which I preferably employ, and Figure 8 is an end view of Figure 7.

Referring to the drawings, 9 and 10 represent two similarly formed link sections which are substantially U-shape and which includes leg portions 11 and 12 which have enlargements 13 at their extreme ends adapted to respectively abut each other as shown in Figure 1. Each of these enlargements has inwardly extending lips 14 which are slightly spaced from the inner surfaces 15 of the leg portions 11 and 12 to provide undercut end locking recesses 16. The abutting surfaces 17 of the enlargements 13 have channels 18 of substantially semi-circular cross section as clearly shown in Figure 4; said channels being adapted to register to provide a space through which the shank 19 of a bolt 20 transversely extends; one end of the channels being preferably counter-sunk as shown at 21 to form a seat for a tapered head 22 of the bolt 20. The opposite end of the bolt may be provided with a castrated nut 23; the bolt being split at 24 to permit a cotter pin 25 to be extended therethrough or if desired as shown in Figure 1 the end of the bolt may be merely provided with a hole in which a cotter pin 25ª is inserted. A connecting stud plate 26 is adapted to bridge the parting between the link sections 9 and 10; said stud plate having inwardly recessed opposite ends 27 and also being provided with a partition portion 28 adapted to fit between the opposed surfaces 29 of the enlargements 13. The opposite end portions of the stud plate 26 has recesses 30 into which the lips 14 fit and are also provided with tongues 31 which fit within the recesses 16 of the leg portions 11 and 12. The side surfaces 32 of the connecting stud plate are adapted to fit against the inner surfaces of the leg portions leading toward the closed ends of said sections as clearly shown in Figure 1. The stud plate 26 has a central hole 33 which extends transversely therethrough and through which the shank of the bolt extends. This structure keeps the stud plate 26 within the plane of the leg portions 11 and 12.

It is thus obvious that if it is desired for example to connect two ends of a chain together that it is merely necessary to remove the bolt and push the stud plate out of connection with the link sections. The link sections will then be separated and can be individually hooked to the ends of the chain which are to be secured together. The enlargements can then be moved into abutment and the stud plate can be inserted and the bolt pushed into position so as to lock the parts together. This operation can be easily and quickly performed and it will be noted that the interlocking of the sections and stud plate prevent the sections from being pulled apart either longitudinally or transversely. At the same time the stud plate serves as a central reinforcement for the link.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A split link having end sections with opposed leg portions and a stud plate having parts interlocking with the inner sides of the leg portions of both sections to prevent lateral spreading movement of said leg portions; substantially as described.

2. A split link having end sections with opposed leg portions and a stud plate confined within the leg portions and having parts slidably interlocking with both the inner sides of said sections to prevent longitudinal separation and lateral spreading movement of said leg portions; substantially as described.

3. A split link having end sections with opposed leg portions and a stud plate slidably interlocking both sections; and a bolt extending through said stud plate and having its opposite ends bearing against the sides of the leg portions; substantially as described.

4. A split link including two sections having opposed leg portions provided with enlargements having inwardly extending lips spaced from the leg portions to provide undercut recesses; and a stud plate interposed between said leg portions and having tongues fitting said recesses whereby the leg portions are prevented from spreading; substantially as described.

5. A split link including two sections having opposed leg portions provided with enlargements having inwardly extending lips spaced from the leg portions to provide recesses; and a stud plate interposed between said leg portions and having tongues fitting said recesses, said stud plate also having recesses into which said lips of the leg portions fit; substantially as described.

6. A split link including two sections having opposed leg portions provided with enlargements having inwardly extending lips spaced from the leg portions to provide recesses; a stud plate interposed between said leg portions and having tongues fitting said recesses, said stud plate also having recesses into which said lips of the leg portions fit, said enlargements having registering channels, the stud plate having a hole therethrough in alignment with said channels; and a bolt extending through said channels and hole in the stud plate; substantially as described.

7. A split link comprising end sections with opposed leg portions; a stud plate having parts interlocking with the inner sides of said leg portions to prevent longitudinal separation and lateral spreading of the sections, said stud plate being displaceable facewise, and a connecting member extending laterally through the co-acting leg portions and edgewise of the plate to connect the parts against spreading movement and prevent displacement of the plate.

In testimony whereof I have signed my name to this specification in the presence of two subscribing witnesses.

WILLIAM MATHIS BATEMAN.

Witnesses:
ELIZABETH GARBE,
CHAS. E. POTTS.